US008032371B2

(12) United States Patent
Baumgarte

(10) Patent No.: US 8,032,371 B2
(45) Date of Patent: Oct. 4, 2011

(54) DETERMINING SCALE FACTOR VALUES IN ENCODING AUDIO DATA WITH AAC

(75) Inventor: Frank M. Baumgarte, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 1436 days.

(21) Appl. No.: 11/495,073

(22) Filed: Jul. 28, 2006

(65) Prior Publication Data

US 2008/0027709 A1 Jan. 31, 2008

(51) Int. Cl.
*G10L 15/20* (2006.01)

(52) U.S. Cl. ........ 704/233; 704/226; 704/230; 704/500; 704/501; 704/503

(58) Field of Classification Search ........................ None
See application file for complete search history.

(56) References Cited

U.S. PATENT DOCUMENTS 6,499,010 B1 12/2002 Faller
7,003,449 B1* 2/2006 Absar et al. ................ 704/200.1
7,346,514 B2* 3/2008 Herre et al. ................... 704/273
2002/0146984 A1* 10/2002 Suenaga ...................... 455/67.1
2003/0079222 A1* 4/2003 Boykin et al. .................. 725/31
2003/0088400 A1* 5/2003 Nishio et al. .................. 704/201
2003/0091194 A1* 5/2003 Teichmann et al. ............... 381/2
2004/0131204 A1* 7/2004 Vinton ............................ 381/98
2004/0181394 A1* 9/2004 Kim et al. .................. 704/200.1
2004/0196913 A1 10/2004 Chakravarthy et al.
2005/0267744 A1* 12/2005 Nettre et al. .................. 704/222

OTHER PUBLICATIONS

Aggarwal, A. et al., "Trellis-Based Optimization of MPEG-4 Advanced Audio Coding" 2000 IEEE (3 pages).
Aggarwal, A. et al., "A Trellis-Based Optimal Parameter Value Selection for Audio Coding" 2006 IEEE (11 pages).
Aggarwal, A. et al., "Near-Optimal Selection of Encoding Parameters for Audio Coding" 2001 IEEE (4 pages).
U.S. Appl. No. 11/495,207, filed Jul. 28, 2006, Office Action, Feb. 16, 2011.
U.S. Appl. No. 11/495,207, filed Jul. 28, 2006, Office Action, Sep. 7, 2010.

* cited by examiner

*Primary Examiner* — Leonard Saint Cyr
(74) *Attorney, Agent, or Firm* — Hickman Palermo Truong & Becker LLP; Daniel D. Ledesma

(57) ABSTRACT

Techniques for determining scale factor values when encoding audio data are described. According to one technique, a particular scale factor value (SFV) is estimated using an audio quality estimator function that is non-linear. After a certain point, a decrease in noise results in a smaller increase in audio quality. According to another technique, an initial SFV is estimated for each scale factor band (SFB). When estimating the cost of transitioning from one SFB to another, only a proper subset of possible SFVs are considered. The proper subset is based, at least in part, on the initial SFV.

25 Claims, 6 Drawing Sheets

DETERMINING SCALE FACTOR VALUES IN ENCODING AUDIO DATA WITH AAC

CROSS-REFERENCE TO RELATED APPLICATIONS

This application is related to U.S. patent application No. 11/495,207 filed herewith, entitled "BITRATE CONTROL FOR PERCEPTUAL CODING" the Ser. No. 11/495,207 filed Jul. 28, 2006, entitled "BITRATE CONTROL FOR PERCEPTUAL CODING"; the entire contents of which is incorporated by this reference for all purposes as if fully disclosed herein.

FIELD OF THE INVENTION

The present invention relates generally to digital audio processing and, more specifically, to rate-distortion control by optimizing the selection of scale factor values when encoding audio data.

BACKGROUND

The approaches described in this section are approaches that could be pursued, but not necessarily approaches that have been previously conceived or pursued. Therefore, unless otherwise indicated, it is not to be assumed that any of the approaches described in this section qualify as prior art, merely by virtue of their inclusion in this section.

Audio coding, or audio compression, algorithms are used to obtain compact digital representations of high-fidelity (i.e., wideband) audio signals for the purpose of efficient transmission and/or storage. A central objective in audio coding is to represent the signal with a minimum number of bits while achieving transparent signal reproduction, i.e., while generating output audio which cannot be humanly distinguished from the original input, even by a sensitive listener.

Advanced Audio Coding ("AAC") is a wideband audio coding algorithm that exploits two primary coding strategies to dramatically reduce the amount of data needed to convey high-quality digital audio. Signal components that are "perceptually irrelevant" and can be discarded without a perceived loss of audio quality are removed. Further, redundancies in the coded audio signal are eliminated. Hence, efficient audio compression is achieved by a variety of perceptual audio coding and data compression tools, which are combined in the MPEG-4 AAC specification. The MPEG-4 AAC standard incorporates MPEG-2 AAC, forming the basis of the MPEG-4 audio compression technology for data rates above 32 kbps per channel. Additional tools increase the effectiveness of AAC at lower bit rates, and add scalability or error resilience characteristics. These additional tools extend AAC into its MPEG-4 incarnation (ISO/IEC 14496-3, Subpart 4).

AAC is referred to as a perceptual audio coder, or lossy coder, because it is based on a listener perceptual model, i.e., what a listener can actually hear, or perceive. A common problem in perceptual audio coding is bitrate control. According to the concept of Perceptual Entropy, the information content of an audio signal varies dependent on the signal properties. Thus, the required bitrate to encode this information generally varies over time. For some applications bitrate variations are not an issue. However, for many applications a firm control of the instantaneous and/or average bitrate is desired.

The three basic bitrate modes for audio coding are CBR (constant bitrate), ABR (average bitrate) and VBR (variable bitrate). CBR is important to bitrate-critical applications, such as audio streaming. Unlike CBR, in which bitrates are strictly constant at each instance, ABR allows a variation of bitrates for each instance while maintaining a certain average bitrate for the entire track, thereby resulting in a reasonably predictable size to the finished files. As the name indicates, VBR allows the bitrate to vary significantly; however, the sound quality is consistent.

A CBR codec is constant in bitrate along an audio time signal, but is typically variable in sound quality. For example, for stereo encoding at a bitrate of 96 kb/s, an encoded speech track, which is "easy" to encode due to its relatively narrow frequency bandwidth, sounds indistinguishable from the original source of the track. However, noticeable artifacts could be heard in similarly encoded complex classical music, which is "difficult" to encode due to a typically broad frequency bandwidth and, therefore, more data to encode.

Simultaneous Masking is a frequency domain phenomenon where a low level signal, e.g., a narrow-band noise (the maskee) can be made inaudible by a simultaneously occurring stronger signal (the masker). A masked threshold can be measured below which any signal will not be audible. The masked threshold depends on the sound pressure level (SPL) and the frequency of the masker, and on the characteristics of the masker and maskee. If the source signal consists of many simultaneous maskers, a global masked threshold can be computed that describes the threshold of just noticeable distortions as a function of frequency. The most common way of calculating the global masked threshold is based on the high resolution short term energy spectrum of the audio or speech signal.

Coding audio based on a psychoacoustic model encodes audio signals above a masked threshold block by block. Therefore, if distortion (typically referred to as quantization noise), which is inherent to an amplitude quantization process, is under the masked threshold, a typical human cannot hear the noise. A sound quality target is based on a subjective perceptual quality scale (e.g., from 0-5, with 5 being best quality). From an audio quality target on this perceptual quality scale, a noise profile, i.e., an offset from the applicable masked threshold, is determinable. This noise profile represents the level at which quantization noise can be masked, while achieving the desired quality target. From the noise profile, appropriate quantization step sizes are determinable. The quantization step sizes are a significant determining factor of the coding bitrate.

The more bits allocated for encoding a block of audio, the less noise may be generated during the quantization process. However current techniques for estimating how many bits to allocate are inefficient. For example, current techniques estimate audio quality based on an erroneous assumption of the noise-to-audio quality relationship. As another example, current techniques take into account all possible scale factor values at each scale factor band, which requires a significant number of calculations.

Based on the foregoing, there is room for improvement in estimating scale factor values when encoding audio data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
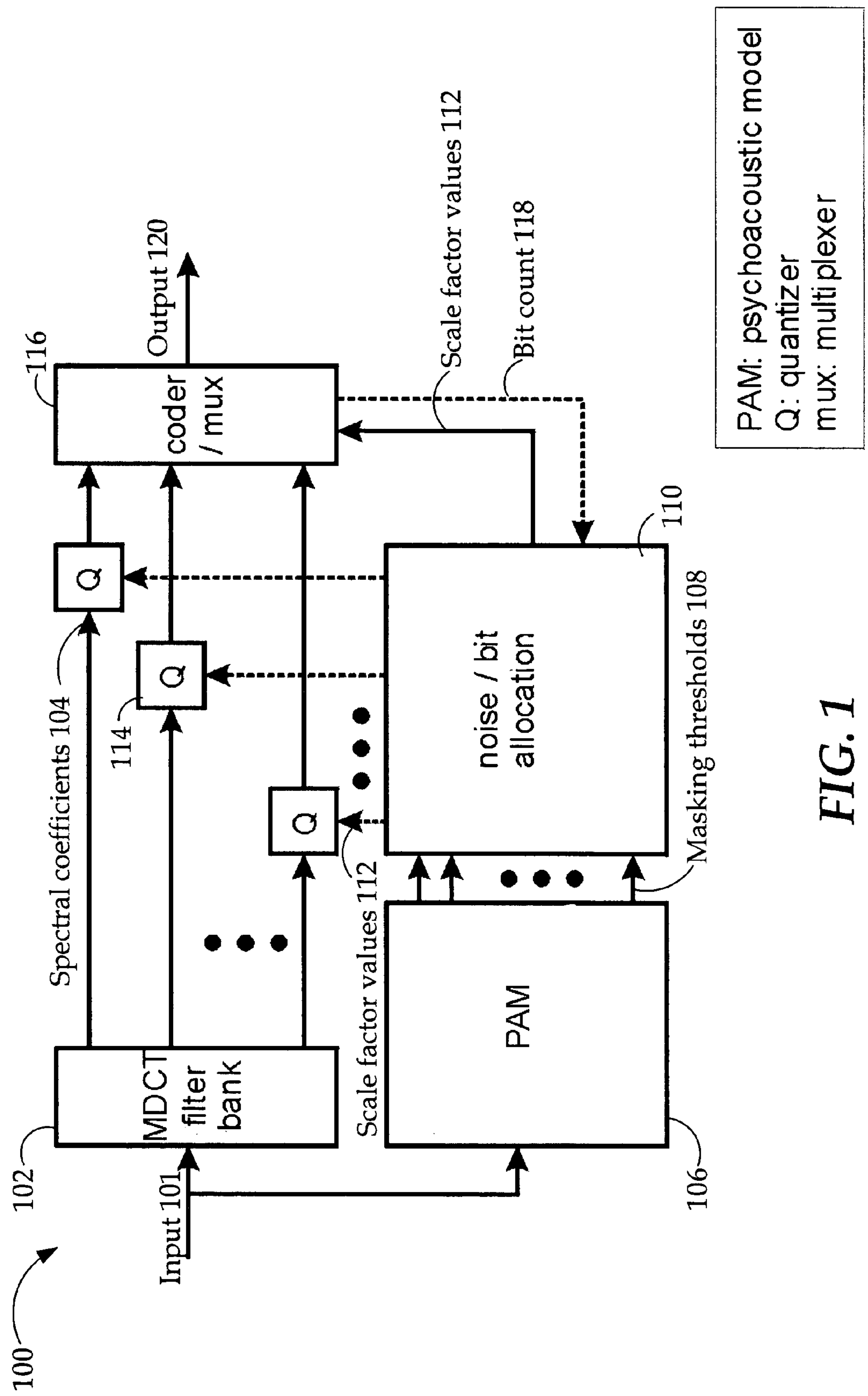
FIG. 1 is a block diagram that illustrates an exemplary perceptual audio coder, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Perceptual audio coding aims to achieve the best perceived audio quality for a given target bitrate; or, conversely, perceptual audio coding aims to achieve the lowest bitrate for a given audio quality target. The following encoder modules may be used to achieve these aims: a) a psychoacoustic model that estimates a masked threshold, b) a bit allocation module that controls which parameters and spectral coefficients are transmitted and at which resolution, and c) a multiplexer that forms a valid bitstream.

Conceptually, the masked threshold indicates the maximum spectral level of quantization distortions that will be just inaudible. Audio coders have a bit allocation module designed to shape the quantization noise such that the quantization noise just approaches the masked threshold. This noise shaping is achieved by modifying “scale factor values” (SFVs) which in turn determine the amount of quantization noise created in each “scale factor band” (SFB). As opposed to the traditional approach, this description introduces a new bit allocation approach that optimizes the SFVs, the number of bits used for encoding (e.g. MDCT) spectral coefficients, and the audio quality. Although this bit allocation process is applied to AAC, it is applicable to other coders, such as MP3, AC-3, and WMA.

In one approach, when estimating the cost of using a particular SFV for a particular SFB, the amount of noise of using the SFV is determinable. One factor that the cost takes into account when choosing the SFV is the audio quality achieved. Audio quality acts as a “credit” whereas the number of bits (e.g., to encode the quantized spectral coefficients and SFVs) acts as a “debit.” Instead of assuming that a constant decrease in noise has a corresponding constant increase in audio quality, a more accurate modeling of audio quality based on noise is used. Such a model may be based on a non-linear function where, after a certain level of noise, a decrease in noise does not correspond to a proportional increase in audio quality.

In another approach, when estimating the cost of transitioning from one SFB to another SFB, instead of considering all possible SFVs, only a proper subset of the possible SFVs are considered, thus reducing the computational complexity. The subset is determined based on an initial SFV where a certain number of SFVs “above” the initial SFV are considered and a certain number of SFVs “below” the initial SFV are considered.

In another approach, the initial SFV is generated based on an efficient formula that considers the masked threshold intensity for the corresponding SFB and the band energy or sum of spectral coefficient magnitudes of the corresponding SFB without performing any computationally-expensive square root operations.

Coding Overview

FIG. 1 is a block diagram that illustrates an example of a perceptual audio coder 100, according to an embodiment of the invention. Audio coder 100, which processes input 101, typically processes an audio signal in blocks of subsequent audio samples. For example, a typical block size comprises 1024 samples. Each block is referred to hereinafter as a “frame”. A modified discrete cosine transform (MDCT) 102 is used to decompose the audio signal (e.g., input 101) into spectral coefficients 104, each one carrying a single frequency subband of the original signal. The MDCT input is typically comprised of two audio signal blocks, i.e., the previous block concatenated with the current block. The MDCT output represents the spectral content of a single frame. Filter banks other than an MDCT filter bank may also be used.

In addition to filter bank 102, input 101 is also received at a psychoacoustic model (PAM) 106. PAM 106 predicts masked threshold levels 108 for quantization noise based on input 101 and a set of parameter values. A masked threshold level 108 is the quantization noise level at which noise (resulting from quantizing certain spectral coefficients 104) is just inaudible. Each masked threshold level 108 corresponds to a group of related spectral coefficients 104, called “scale factor bands” (SFBs). There are typically 49 different SFBs in a traditional perceptual coder to mimic the critical band model of the human auditory system. This means that if there are 1024 spectral coefficients, then the SFB representing the lowest frequency band comprises typically four spectral coefficients, and gradually a larger number of spectral coefficients are included in bands at higher frequencies.

It is useful to isolate different frequency components in a signal because some frequencies are more important than others. Important frequency components should be coded with finer resolution because small differences at these frequencies are significant and a coding scheme that preserves these differences should be used. On the other hand, less important frequency components do not have to be exact, which means a coarser coding scheme may be used, even though some of the finer details will be lost in the coding. PAM 106 accounts for these differences in human auditory perception.

A noise/bit allocation module 110 calculates a scale factor value 112 for each SFB based on the corresponding masked threshold level 108. In order to reduce the quantization noise level for each SFB, finer quantization must be used. With finer quantization, more bits are usually required to encode the quantized data. 100311 Once SFVs 112 are determined by noise/bit allocation module 110, spectral coefficients 104 of a given SFB are quantized by a quantizer 114 with the corresponding SFV 112. Any quantization scheme may be used, such as uniform and non-uniform quantization. The spectral coefficients of a given SFB are quantized by the same quantizer 114 but different quantizers 114 may be applied to different SFBs.

Quantizers 114 may be non-uniform with larger step sizes for larger values. Quantization step size is modified by scaling the quantizer input with a multiplier that depends on the SFV associated with each SFB.

The quantized spectral coefficients are encoded and multiplexed by a coder/mux module 116. FIG. 1 illustrates that SFVs 112 (or rather the differences between successive SFVs 112) are also encoded and multiplexed by coder/mux module 116. Thus, if the differences between SFVs 112 are relatively small, then the resulting bit count 118 should be less than if the differences were not small, everything else being equal. Any coding scheme may be used to encode the data, such as Huffman coding, and embodiments of the invention are not limited to any particular coding scheme.

The result of encoding and multiplexing all the foregoing data is examined (e.g., by noise/bit allocation module 110) to determine whether a bit count 118 of the result is too high or too low, depending on the target bitrate (whether CBR or ABR). Bit count 118 represents a number of bits that may be used to encode input 101. Output 120 represents the output of encoding input 101.

Non-Uniform Quantization

An interesting observation is the fact that bit count 118 may increase even if the quantization noise increases or, conversely, bit count 118 may decrease when the quantization noise decreases. Such behavior is counterintuitive. This behavior is caused by the non-uniform processes involved in bit allocation, namely the coding scheme used (e.g. Huffman coding) and particularly the non-uniform quantization (i.e., non-uniform step sizes of quantizers 114).

Figure 2A:
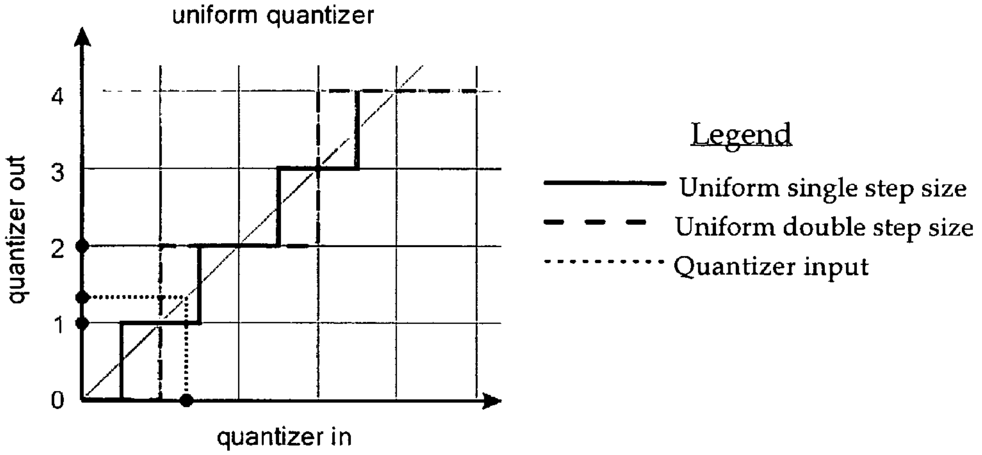
FIG. 2A-B are graphs that illustrate exemplary uniform and non-uniform quantizers.

To illustrative this behavior, suppose a uniform quantizer is used and the quantization step sizes double (see FIG. 2A). The new quantizer steps (the possible output values) are located at positions of the old quantizer steps. Thus, the quantization error is either the same or larger than before.

Figure 2B:
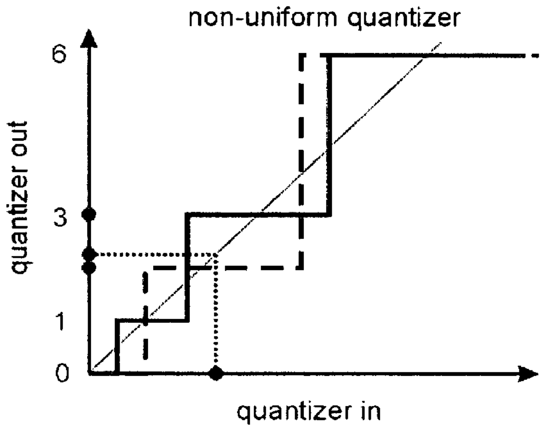

This is not the case for a non-uniform quantizer. If the step sizes are doubled, the new quantizer will have the quantization steps at new positions (see FIG. 2B). Non-uniform quantizers are typically used in coding audio because non-uniform quantizers exhibit better performance than uniform quantizers. Non-uniform quantizers allow more levels (i.e. small step sizes) for weaker signals, which results in "fine" quantization. Conversely, non-uniform quantizers allow less levels (i.e. large step sizes) for stronger signals, which results in "coarse" quantization.

For most spectral coefficients, it cannot be assumed that the quantizers operate in the range of "fine" quantization. "Fine" quantization means that the quantizer step size and the expected quantization error are much smaller than the spectral coefficients. Thus, a monotonous increase of the expected quantization error with increasing step size cannot be guaranteed. Rather, it is common that the quantization error energy fluctuates when the quantizer step size is increased, especially in SFBs that contain only a few spectral coefficients that are non-zero after quantization.

New Bit Allocation Approach

Given the fact that the quantization noise may decrease even if the number of bits is reduced, it becomes obvious that traditional bit allocation approaches waste bits. Traditional approaches adjust the distortion level closely to the masked threshold but fail to take into account how many bits will be needed. In contrast, the new approach aims at finding an optimal compromise between the number of bits spent and the achieved audio quality of each frame. The optimization process may be embedded in a dynamic program which presents a computationally highly efficient implementation.

The dynamic program may be best understood by introducing the concept of a cost function. In this framework "cost" is thought of as a measure of the number of bits transmitted in relation to the resulting audio quality. Thus, the cost function accumulates all the bits spent for SFVs 112 and quantized spectral coefficients 104, and a value corresponding to audio quality is subtracted as a "credit". The cost is calculated independently for each audio frame. Cost is typically not calculated independently for each SFB because the number of bits per SFB depends on the neighboring band.

Figure 3:
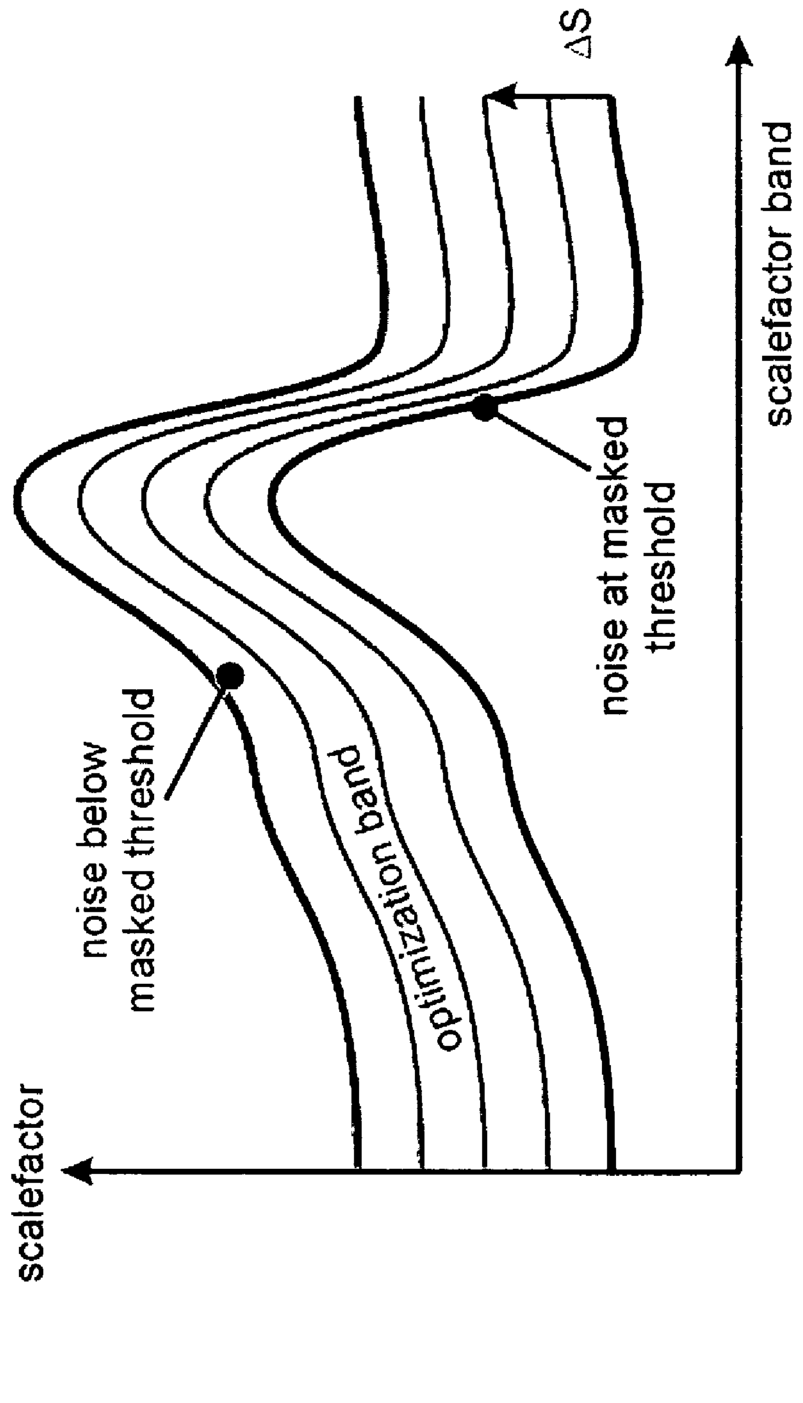
FIG. 3 is a diagram that illustrates a range of scale factor values for optimization in a dynamic program, according to an embodiment of the invention.

The idea of the new bit allocation approach consists of using the masked threshold as the upper bound of quantization distortion and to evaluate different bit count-versus-quality tradeoffs for distortion levels up to the masked threshold. Such a procedure may be implemented by starting with an initial SFV estimation that determines a SFV for each SFB such that the expected quantization distortion approaches the masked threshold. Subsequently, the number of bits for quantized spectral coefficients 104 is calculated for each SFB while considering the projected audio quality. The number of bits for quantized spectral coefficients 104 and quality estimates are also calculated for all SFBs with increased scale factors by adding 0, 1, 2, . . . , $\Delta S_{max}$ to each initial SFV (where, for example, $\Delta S_{max}=10$). ΔS is the scale factor value increment. The range of scale factors for optimization in the dynamic program is outlined in FIG. 3. For improved efficiency, exactly the same results may be obtained when the scale factor incrementing is replaced by decrementing the global gain by ΔS.

The pre-computed a) number of bits for quantized spectral coefficients 104 and b) audio quality estimates may be organized in a table for access by the dynamic program. The dynamic program minimizes the cost function by finding the optimal path in a lattice that graphically represents the contributions of partial costs.

Figure 4:
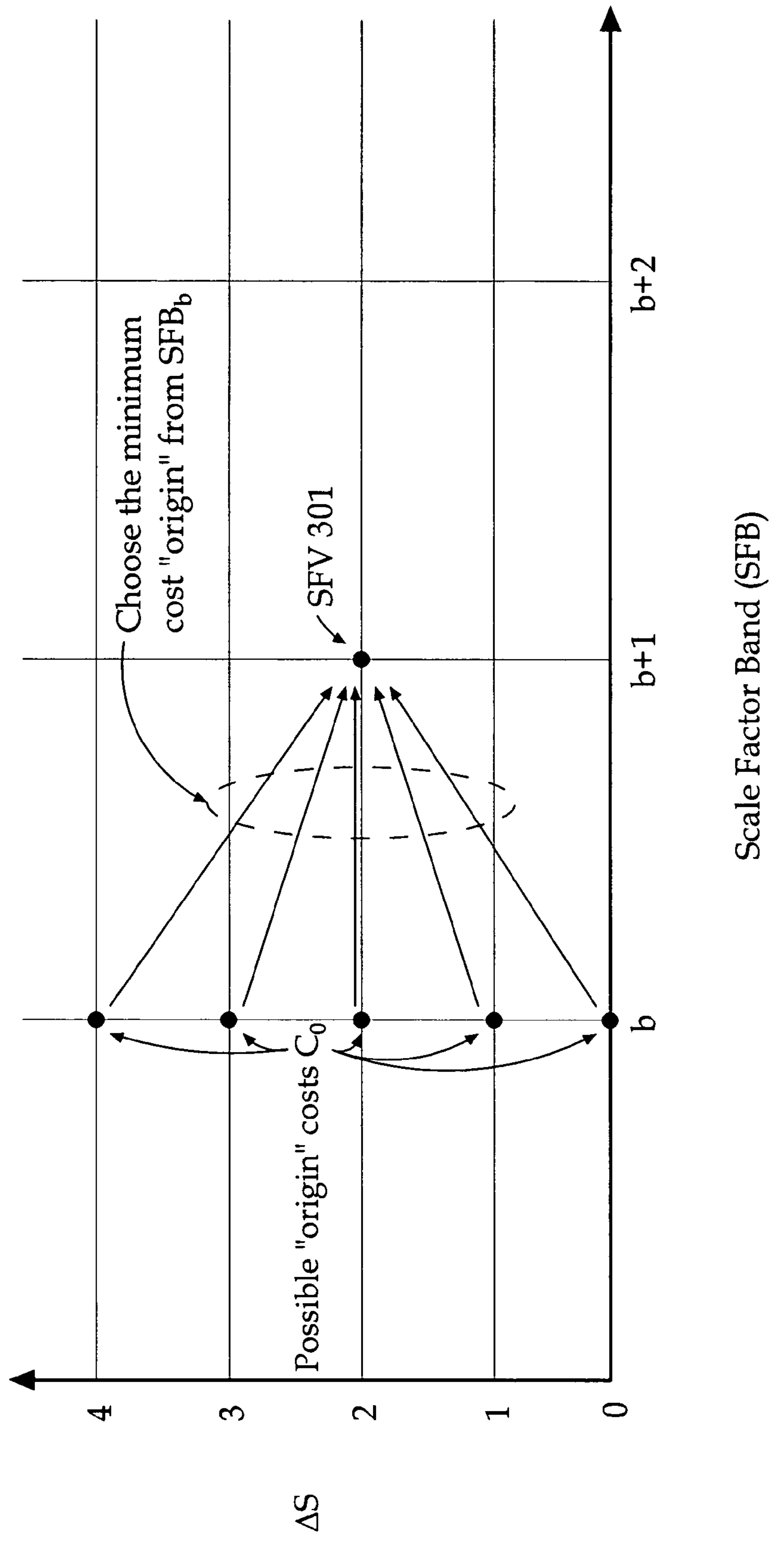
FIG. 4 is a diagram that illustrates a lattice and the contributions of partial costs to the cost of transitioning from one scale factor band to another scale factor band, according to an embodiment of the invention.

FIG. 4 is a diagram that illustrates such a lattice and the contributions of partial costs to the cost of transitioning from $SFB_b$ to $SFB_{b+1}$, according to an embodiment of the invention. The cost function is minimized by accumulating the costs for each SFB starting with $SFB_0$ and proceeding to subsequent SFBs. For example, to determine the minimum cost of transitioning from $SFB_b$ to SFV 401 in $SFB_{b+1}$ (which has an offset of ΔS=2), for each SFV in $SFB_b$ the "origin" cost is added to the number of bits required to encode SFV 401 plus the number of bits for the quantized spectral coefficients at $SFB_{b+1}$ minus a weighted audio quality. The SFV in $SFB_b$ that produces the minimum cost of transitioning from $SFB_b$ to SFV 401 is selected. The information of that SFV in $SFB_b$ is saved so that the optimal path may be determined once all costs have been calculated.

This process is repeated for each SFV in $SFB_{b+1}$ and then continues for each SFV in $SFB_{b+2}$, and so forth. Once the cost of transitioning to each SFV in the last SFB is determined, the optimal scale factor offsets ΔS are found by tracing back the optimal path from the final SFB to $SFB_0$.

According to an embodiment of the invention, the minimization procedure may be expressed formally with the following variables and equations:

$C_O$: accumulated costs of "origin"
$C_D$: accumulated costs of "destination"
$\Delta S_b$: scale factor offset in $SFB_b$
$N_S$: number of bits for scale factor coding
$N_{MDCT}$: number of bits for spectral coefficient coding
$\Delta Q$: audio quality estimate
w: weighting factor
b: SFB index $$C_O(\Delta S_0)=N_{MDCT}(\Delta S_0)-w\Delta Q(\Delta S_0) \text{ for } \Delta S_0=0,1,\ldots,\Delta S_{max} \quad (1)$$

$$C_D(\Delta S_{b+1})=\text{Min}[C_O(\Delta S_{b+1}-\Delta S_b)]_{for\,\Delta S_{b+1}=0,1,\ldots,\Delta S_{max}} \quad (2)$$

$$C_O(\Delta S_{b+1})=C_D(\Delta S_{b+1})+N_{MDCT}(\Delta S_{b+1})-w\Delta Q(\Delta S_{b+1}) \text{ for } \Delta S_{b+1}=0,1,\ldots,\Delta S_{max} \quad (3)$$

The procedure may begin with equation (1) to compute "origin" costs for all scale factor offsets in the first SFB ($SFB_0$). Subsequently, equations (2) and (3) are applied to compute the "destination" costs and the "origin" costs in each SFB from $SFB_0$ to $SFB_{b-1}$ until all SFBs are processed. When applying equation (3), the value of ΔS that provides minimum "destination" costs must be saved so that the optimal path can be traced-back. Because there are typically 121 possible SFVs, equation (3) may be applied 121 times for each $SFB_b$.

Typically, a weighting factor w is associated with the audio quality estimate. Weighting factor w is used as a parameter to trade off bitrate and audio quality. For larger values of w the quality and bitrate will increase. Thus, w may have a different value for each target bitrate. In VBR mode, w typically does not change during the encoding process. In CBR mode, if bit count 118 is outside a specified range, w may be modified during the encoding process of the current frame or the subsequent frame.

Audio Quality Estimation

The bit counting mechanism includes the quantization process of the spectral coefficients 104. However, in order to calculate the distortion level in each SFB, inverse quantization is also necessary. The distortion amplitude is divided by the masked threshold (generated by PAM 106) to yield the Noise-to-Mask Ratio (NMR).

Figure 5A:
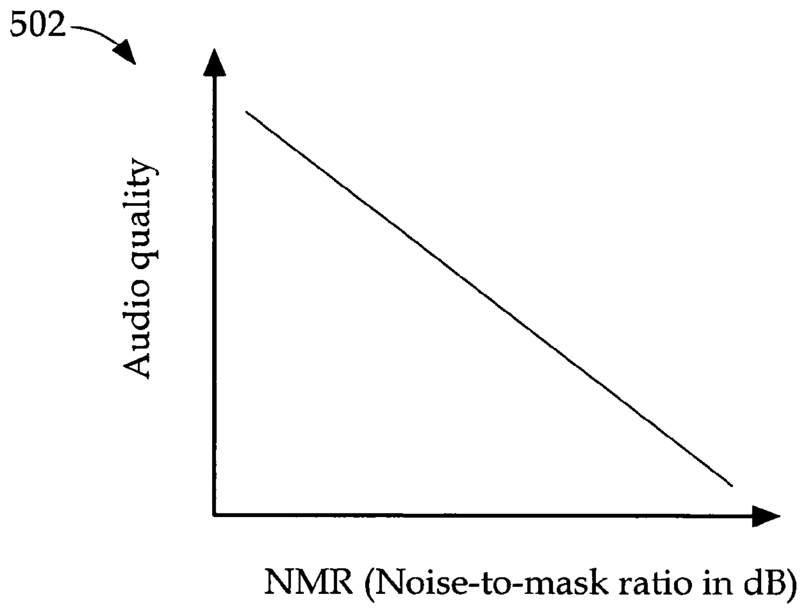
FIG. 5A is a graph that illustrates the assumption that current approaches adopt of how audio quality is effected as the quantization noise level decreases when estimating the cost of using certain scale factor values.

Current approaches to estimating audio quality (ΔQ) derive ΔQ from examining the NMR and assume that the audio quality increases at a constant rate as the NMR decreases at a constant rate and vice versa (see FIG. 5A). However, such a linear model is not consistent with human audio perception. As the noise decreases past a certain point, the audio quality does not increase by a similar magnitude. In other words, distortion level changes after a certain point become increasingly less audible. Thus, current techniques of estimating the cost of transitioning from $SFB_b$ to $SFB_{b+1}$ attribute too much weight to ΔQ.

Also, traditionally, the masked threshold was interpreted as a sharp division between an upper level range where a probe or distortion will be audible and a lower level range where this probe or distortion is not audible. However, it is obvious from any psychoacoustic masking experiment that a masked threshold is not as clear cut as the name might indicate. Rather it is more correct to interpret the masked threshold as a level above which the detection of a probe or distortion just becomes larger than chance.

Figure 5B:
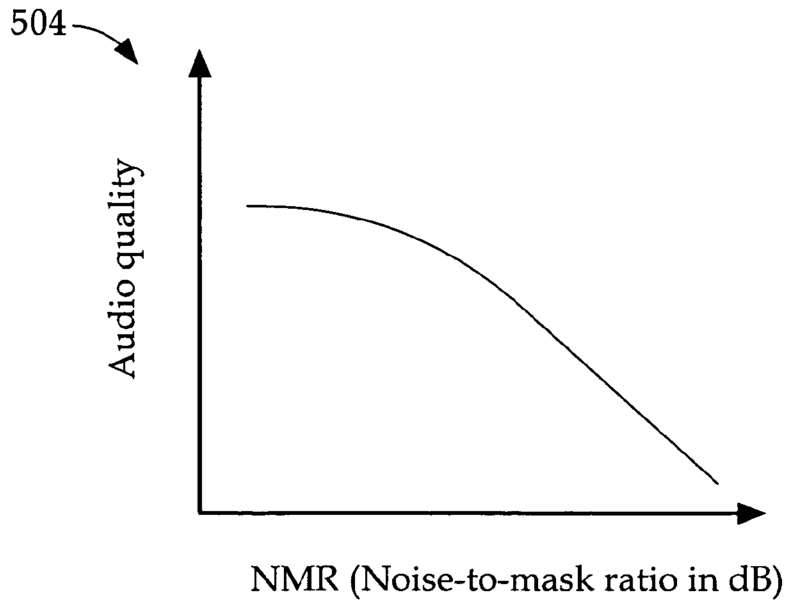
FIG. 5B is a graph that illustrates an accurate behavior of how audio quality is effected as the quantization noise level decreases when estimating the cost of using certain scale factor values, according to an embodiment of the invention.

According to one embodiment, the audio quality estimate is derived by a parametric function as shown in FIG. 5B. At 0 dB NMR, the distortion level is at the masked threshold. For a higher distortion level the audio quality decreases linearly with NMR. If the distortion level is below the masked threshold, then the audio quality increases but it slowly "saturates" when the distortion level is much below the masked threshold. This saturation reflects the fact that a distortion will become inaudible if its level is low enough; thus, the audio quality cannot increase beyond that point.

According to one embodiment, the arithmetic expression for the quality estimation function is:

$$\Delta Q = \begin{cases} 1-(1-L_{NMR})^{-R}; & \text{if } L_{NMR}<0 \\ -RL_{NMR}; & \text{else} \end{cases}$$

The Noise-to-Mask Ratio in dB is called $L_{NMR}$. The variable R determines the slope of the estimation function. The value of R may be constant and tuned by an offline process to increase the overall coder performance.

According to one embodiment, ΔQ is determined from a lookup table that associates a ΔQ value with a particular $L_{NMR}$.

Considering a Proper Subset of Possible Scale Factor Values at a Scale Factor Band Typically, there are 121 possible SFVs that are considered at each SFB. Because there are usually 49 SFBs in a traditional perceptual coder, approximately 6000 calculations (121*49) are necessary to determine an optimal set of SFVs.

According to an embodiment, not all possible SFVs are considered at a $SFB_b$ and $SFB_{b+1}$ when estimating the cost of transitioning from a particular SFV in the $SFB_b$ to another SFV in $SFB_{b+1}$. For example, suppose that there are 121 possible SFVs that may be considered when estimating the cost of transitioning from one SFB to another SFB. Further suppose that only SFVs within ten of the initial scale factor estimate (i.e., ΔS=10) are considered at each $SFB_b$, meaning that at most 21 different SFVs may be considered at each $SFB_b$. For example, if the range of SFVs was from 1 to 121 in whole number increments, then an initial SFV of 6 would imply that only 16 SFVs (i.e., 6+10=16 and 6−10=−4, but the lowest a SFV is allowed to be in this example is 1) would be considered. Thus, instead of approximately 6000 calculations (121*49), only considering SFVs where ΔS=10 indicates that less than 1000 calculations (21*49) would have to be made.

Such a restriction in the number of SFVs is based on the assumption that the perceptual coder includes at least an acceptable scale factor estimation function (SFEF), one of which is described in the following section. If the SFEF is relatively accurate, then the initial noise level is close to the masked threshold and the finally selected SFV in a SFB can be expected to be "close" to the initial (i.e., estimated) SFV in that SFB. Without an accurate SFEF, it would not be clear which subset of the possible SFVs to consider.

Scale Factor Post-Processing

After scale factor optimization with the dynamic program, there are two additional steps that can modify the scale factors scale factors. First, minimize scale factor differences in SFBs that contain only zeros for each or most spectral coefficients. Second, ensure that SFV differences do not exceed 60.

The first item takes advantage of the fact that a SFV can be chosen arbitrarily if the corresponding spectral coefficients are all quantized to zero. Thus, such SFVs are chosen in a way to minimize the SFV differences which in turn also minimizes the number of SFV bits. This is achieved by continuation of the previous SFV of a nonzero energy band across a continuous range of zero energy bands.

The second item is necessary to avoid exceeding the permitted range for SFV coding. If the magnitude of a SFV difference of neighboring SFVs is larger than 60, then the smaller SFV is increased so that the magnitude of the difference is 60. This will waste a few bits for finer spectral coefficient quantization but it also reduces associated distortions. In general, the limit of 60 is virtually never exceeded for typical audio material.

Scale Factor Estimation

According to an embodiment of the invention, there are multiple alternative scale factor estimation functions (SFEFs), three of which are given in equations (1) through (3) below. Each SFEF may comprise five constant parameters α, β, γ, $\epsilon_1$, $\epsilon_2$ which may be derived experimentally or theoretically. Each SFEF may also comprise two variables on the right side, one of which is the masked threshold intensity $M_b$ in each $SFB_b$. The other variable is calculated from the spectral coefficients $X_n$ in $SFB_b$ as indicated in (6) to (8). A global gain G is derived in (4) and added to each initial scale factor (denoted $S_b'$) in (5) for normalization to yield the final SFV $S_b$.

$$S'_b = \alpha\log_{10}(E_b+\varepsilon_1)+\beta\log_{10}(M_b+\varepsilon_2)+\gamma;\quad \text{for } b=0,\ \ldots\ , B-1 \tag{1}$$

$$S'_b = \alpha\log_{10}(A_b^2+\varepsilon_1)+\beta\log_{10}(M_b+\varepsilon_2)+\gamma;\quad \text{for } b=0,\ \ldots\ , B-1 \tag{2}$$

$$S'_b = \alpha\log_{10}(R_b^4+\varepsilon_1)+\beta\log_{10}(M_b+\varepsilon_2)\gamma;\quad \text{for } b=0,\ \ldots\ , B-1 \tag{3}$$

$$G = -S'_0 \tag{4}$$

$$S_b = S'_b + G;\quad \text{for } b=0,\ \ldots\ , B-1 \tag{5}$$

$$E_b = \sum_{n=N_b}^{N_{b+1}-1} X_n^2 \tag{6}$$

$$A_b = \sum_{n=N_b}^{N_{b+1}-1} |X_n| \tag{7}$$

$$R_b = \sum_{n=N_b}^{N_{b+1}-1} |X_n|^{0.5} \tag{8}$$

The following is a brief description of the variables and parameters of the foregoing equations:

$S_b'$: initial scale factor value
$S_b$: final scale factor value
G: global gain
$M_b$: masked threshold intensity from a psychoacoustic model
$E_b$: scale factor band energy
$A_b$: magnitude sum of MDCT coefficients in band b
$R_b$: sum of square roots of MDCT coefficients in band b
b: scale factor band index
$N_b$: index of first MDCT band in scale factor band b
n: MDCT band index
B: total number of scale factor bands Accurate scale factor estimates may be achieved with the following constants:

α=2.2125
β=−0.885
γ=−11.965
$\epsilon_1$=0
$\epsilon_2$0

A nonzero value of $\epsilon_1$ and $\epsilon_2$ may be used to avoid the potential calculation of a logarithm of 0 when the audio signal samples are zero. In the regular case with nonzero audio samples a small positive value of $\epsilon_1$ and $\epsilon_2$ which is much smaller than the average spectral coefficient X will not significantly affect scale factor estimation.

For equations (1) through (3), similar forms of the equations are also valid. For example, $\log_{10}$ may be replaced by a logarithmic function with a different base (e.g., $\log_2$). Also, equations (1) and (2) are computationally more efficient than (3) because they do not use the square root.

Hardware Overview

Figure 6:
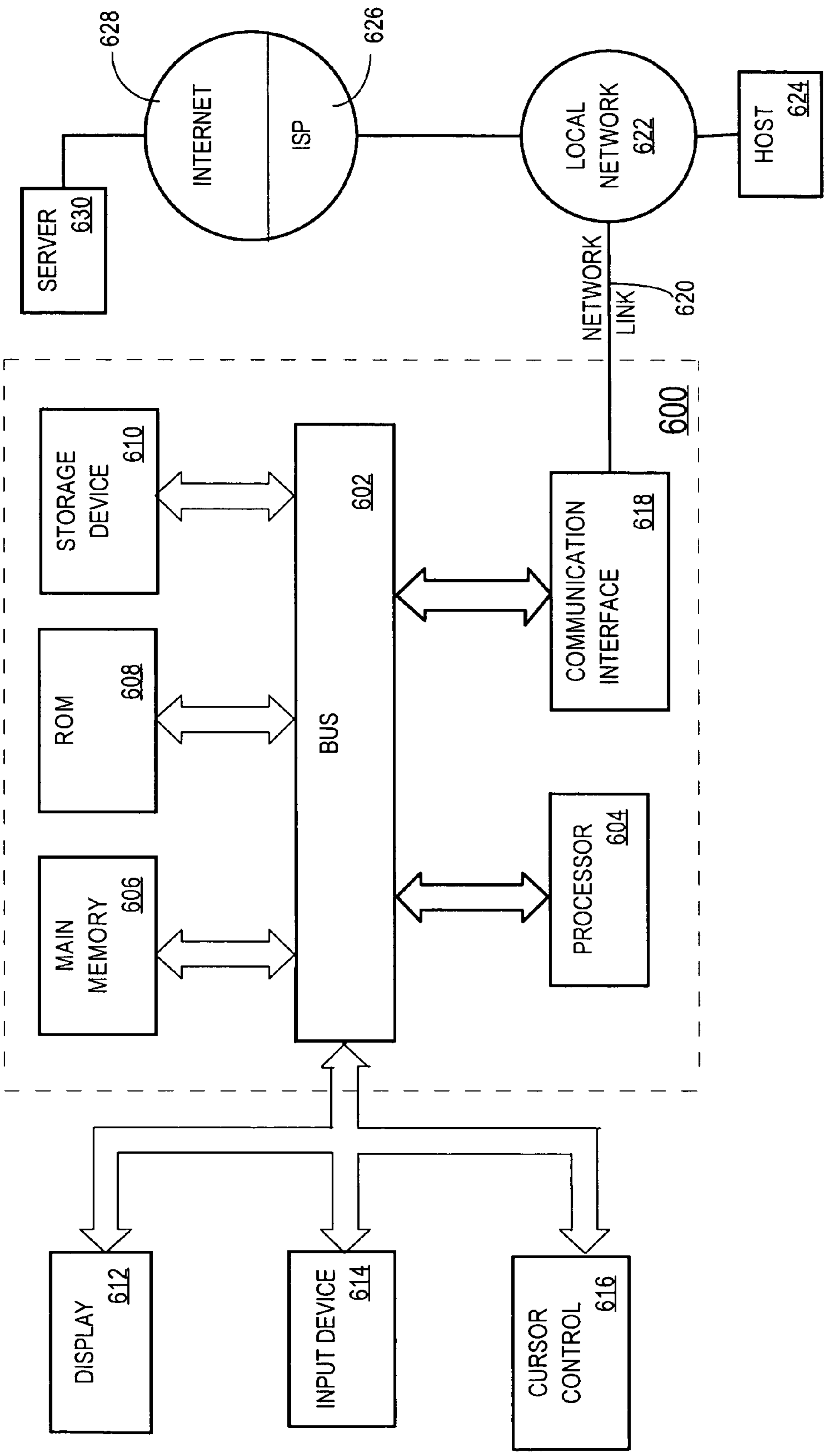
FIG. 6 is a block diagram that illustrates an exemplary computer system, upon which embodiments of the invention may be implemented.

FIG. 6 depicts an exemplary computer system 600, upon which embodiments of the present invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a Liquid Crystal Display (LCD) panel, a cathode ray tube (CRT) or the like, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The exemplary embodiments of the invention are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The phrases "computer readable medium" and "machine-readable medium" as used herein refer to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape and other legacy media and/or any other physical medium with patterns of holes, a RAM, a PROM, and EPROM, a FLΔSH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Equivalents & Miscellaneous

In the foregoing specification, exemplary embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction and including their equivalents. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory machine-readable storage medium storing instructions which, when executed by one or more processors, cause:

estimating a cost of selecting a particular scale factor value to quantize data that represents a portion of digital media;

wherein the estimation is based, at least in part, on an estimated level of quality of media that would be produced by quantizing said data using the particular scale factor value; and using a quality estimation function, at least a portion of which is non-linear, to determine said estimated level of quality;

wherein at least one input to said quality estimation function is a noise-to-mask ratio;

wherein said quality estimation function includes an expression and a constant that is an exponent of the expression, wherein the expression includes the noise-to-mask ratio;

wherein said portion of said quality estimation function is expressed as $Q=1-(1-L)^{-R}$;

wherein L is the noise-to-mask ratio, R is a constant, and Q is an estimated level of quality based on a value of L and a value of R.

2. The machine-readable storage medium of claim 1, wherein the quality estimation function produces quality estimates that reflect diminishing returns when the amount of noise that would be produced by quantizing said data is below a certain threshold.

3. The machine-readable storage medium of claim 1, wherein the quantizer that is used to quantize said data is a non-uniform quantizer.

4. The machine-readable storage medium of claim 1, wherein said data comprises a plurality of modified discrete cosine transform (MDCT) coefficients.

5. A machine-implemented method, comprising:

estimating, by one or more processors, a cost of selecting a particular scale factor value to quantize data that represents a portion of digital media;

wherein the estimation is based, at least in part, on an estimated level of quality of media that would be produced by quantizing said data using the particular scale factor value; and using a quality estimation function, at least a portion of which, is non-linear, to determine said estimated level of quality;

wherein at least one input to said quality estimation function is a noise-to-mask ratio;

wherein said quality estimation function includes an expression and a constant that is an exponent of the expression, wherein the expression includes the noise-to-mask ratio;

wherein said portion of said quality estimation function is expressed as $Q=1-(1-L)^{-R}$;

wherein L is the noise-to-mask ratio, R is a constant, and Q is an estimated level of quality based on a value of L and a value of R.

6. The method of claim 5, wherein the quality estimation function produces quality estimates that reflect diminishing returns when the amount of noise is below a certain threshold.

7. The method of claim 5, wherein the quantizer that is used to quantize said data is a non-uniform quantizer.

8. The method of claim 5, wherein said data comprises a plurality of modified discrete cosine transform (MDCT) coefficients.

9. A system, comprising:

one or more processors;

a memory coupled to said one or more processors;

one or more sequences of instructions which, when executed, cause said one or more processors to perform the steps of:

estimating a cost of selecting a particular scale factor value to quantize data that represents a portion of digital media;

wherein the estimation is based, at least in part, on an estimated level of quality of media that would be produced by quantizing said data using the particular scale factor value; and using a quality estimation function, at least a portion of which is non-linear, to determine said estimated level of quality;

wherein at least one input to said quality estimation function is a noise-to-mask ratio;

wherein said quality estimation function includes an expression and a constant that is an exponent of the expression, wherein the expression includes the noise-to-mask ratio;

wherein said portion of said quality estimation function is expressed as $Q=1-(1-L)^{-R}$;

wherein L is the noise-to-mask ratio, R is a constant, and Q is an estimated level of quality based on a value of L and a value of R.

10. The system of claim 9, wherein the quality estimation function produces quality estimates that reflect diminishing returns when the amount of noise that would be produced by quantizing said data is below a certain threshold.

11. The system of claim 9, wherein the quantizer that is used to quantize said data is a non-uniform quantizer.

12. The system of claim 9, wherein said data comprises a plurality of modified discrete cosine transform (MDCT) coefficients.

13. A non-transitory machine-readable storage medium storing instructions for encoding audio data, wherein the instructions, when executed by one or more processors, cause the one or more processors to perform the steps of, for each scale factor band in a plurality of scale factor bands:

for each scale factor value in a set of potential scale factor values, determining an estimated level of audio quality that would be produced by quantizing data using said each scale factor value, wherein the data comprises spectral coefficients corresponding to said scale factor band;

wherein the determination is made by using a quality estimation function, at least a portion of which is non-linear;

wherein at least one input to said quality estimation function is a noise-to-mask ratio that is based on said each scale factor value;

wherein said quality estimation function includes an expression and a constant that is an exponent of the expression, wherein the expression includes the noise-to-mask ratio;

wherein said portion of said quality estimation function is expressed as $Q=1-(1-L)^{-R}$;

wherein L is the noise-to-mask ratio, R is a constant, and Q is an estimated level of quality based on a value of L and a value of R..

14. A non-transitory machine-readable storage medium storing instructions which, when executed by one or more processors, cause:

generating a plurality of masked thresholds;

generating, based on the plurality of masked thresholds, a set of initial scale factor values, wherein the set of initial scale factor values includes an initial scale factor value for each of a plurality of quantizers to be used in an encoding operation;

for each quantizer of said plurality of quantizers:

selecting, based, at least in part, on the initial scale factor value generated for that quantizer, a proper subset of the scale factor values that are supported by the quantizer, wherein selecting includes selecting one or more scale factor values greater than the initial scale factor value and selecting one or more scale factor values less than the initial scale factor value, wherein some scale factors values that are supported by the quantizer are not selected, and for each scale factor value in the proper subset, generating a cost estimate of the cost of using said each scale factor value with said each quantizer; and selecting scale factor values to use in the encoding operation based, least in part, on the cost estimates.

15. The machine-readable storage medium of claim 14, wherein:

the set of initial scale factor values is generated from a formula that takes into account, for a particular initial scale factor value at a particular scale factor band, (a) a masked threshold intensity of the particular scale factor band and (b) a scale factor energy ($E_b$) of the particular scale factor band or a magnitude sum of spectral coefficients ($A_b$) in the particular scale factor band; and $E_b$ and $A_b$ are based, at least partially, on spectral coefficients associated with the particular scale factor band.

16. The machine-readable storage medium of claim 14, wherein:

the scale factor values are a first set of scale factor values used in the encoding operation; and said instructions, when executed by the one or more processors, further cause:

determining that spectral coefficients that correspond to one or more scale factor bands are substantially zero;

selecting each scale factor value in a second set of scale factor values to use in the encoding operation based on a selected scale factor value that is immediately previous to said each scale factor value;

wherein the second set of scale factor values correspond to the one or more scale factor bands.

17. The machine-readable storage medium of claim 16, wherein the spectral coefficients are modified discrete cosine transform coefficients.

18. A system, comprising:

one or more processors;

a memory coupled to said one or more processors;

one or more sequences of instructions which, when executed, cause said one or more processors to perform the steps of:

generating a plurality of masked thresholds;

generating, based on the plurality of masked thresholds, a set of initial scale factor values, wherein the set of initial scale factor values includes an initial scale factor value for each of a plurality of quantizers to be used in an encoding operation;

for each quantizer of said plurality of quantizers:

selecting, based, at least in part, on the initial scale factor value generated for that quantizer, a proper subset of the scale factor values that are supported by the quantizer, wherein selecting includes selecting one or more scale factor values greater than the initial scale factor value and selecting one or more scale factor values less than the initial scale factor value, wherein some scale factors values that are supported by the quantizer are not selected, and for each scale factor value in the proper subset, generating a cost estimate of the cost of using said each scale factor value with said each quantizer; and selecting scale factor values to use in the encoding operation based, least in part, on the cost estimates.

19. The system of claim 18, wherein:

the set of initial scale factor values is generated from a formula that takes into account, for a particular initial scale factor value at a particular scale factor band, (a) a masked threshold intensity of the particular scale factor band and (b) a scale factor energy ($E_b$) of the particular scale factor band or a magnitude sum of spectral coefficients ($A_b$) in the particular scale factor band; and $E_b$ and $A_b$ are based, at least partially, on spectral coefficients associated with the particular scale factor band.

20. The system of claim 18, wherein:

the scale factor values are a first set of scale factor values used in the encoding operation; and said one or more sequences of instructions are instructions, which, when executed by the one or more processors, further cause the one or more processors to perform the steps of:

determining that spectral coefficients that correspond to one or more scale factor bands are substantially zero;

selecting each scale factor value in a second set of scale factor values to use in the encoding operation based on a selected scale factor value that is immediately previous to said each scale factor value;

wherein the second set of scale factor values correspond to the one or more scale factor bands.

21. The system of claim 20, wherein the spectral coefficients are modified discrete cosine transform coefficients.

22. A machine-implemented method, comprising:

generating, by one or more processors, a plurality of masked thresholds;

generating, based on the plurality of masked thresholds, a set of initial scale factor values, wherein the set of initial scale factor values includes an initial scale factor value for each of a plurality of quantizers to be used in an encoding operation;

for each quantizer of said plurality of quantizers:

selecting, based, at least in part, on the initial scale factor value generated for that quantizer, a proper subset of the scale factor values that are supported by the quantizer, wherein selecting includes selecting one or more scale factor values greater than the initial scale factor value and selecting one or more scale factor values less than the initial scale factor value, wherein some scale factors values that are supported by the quantizer are not selected, and for each scale factor value in the proper subset, generating a cost estimate of the cost of using said each scale factor value with said each quantizer; and selecting scale factor values to use in the encoding operation based, at least in part, on the cost estimates.

23. The method of claim 22, wherein:

the set of initial scale factor values is generated from a formula that takes into account, for a particular initial scale factor value at a particular scale factor band, (a) a masked threshold intensity of the particular scale factor band and (b) a scale factor energy ($E_b$) of the particular scale factor band or a magnitude sum of spectral coefficients ($A_b$) in the particular scale factor band; and $E_b$ and $A_b$ are based, at least partially, on spectral coefficients associated with the particular scale factor band.

24. The method of claim 22, wherein:

the scale factor values are a first set of scale factor values used in the encoding operation; and the method further comprises:

determining that spectral coefficients that correspond to one or more scale factor bands are substantially zero;

selecting each scale factor value in a second set of scale factor values to use in the encoding operation based on a selected scale factor value that is immediately previous to said each scale factor value;

wherein the second set of scale factor values correspond to the one or more scale factor bands.

25. The method of claim 24, wherein the spectral coefficients are modified discrete cosine transform coefficients.

* * * * *